United States Patent
Ikeda et al.

(10) Patent No.: US 6,454,545 B1
(45) Date of Patent: Sep. 24, 2002

(54) COMPRESSOR

(75) Inventors: Hayato Ikeda; Noriyuki Shintoku; Tomohiro Wakita; Keishi Nakagaki, all of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 08/972,849

(22) Filed: Nov. 18, 1997

(30) Foreign Application Priority Data

Nov. 25, 1996 (JP) .............................................. 8-313882
Nov. 10, 1997 (JP) .............................................. 9-307244

(51) Int. Cl.$^7$ ................................................ F04B 1/12
(52) U.S. Cl. ...................... 417/269; 417/571; 137/856; 137/857
(58) Field of Search ................................ 417/269, 569, 417/571; 137/856, 857

(56) References Cited

U.S. PATENT DOCUMENTS

| 5,379,799 A | * | 1/1995 | Kawai et al. ................ 137/856 |
| 5,466,129 A | * | 11/1995 | Fukai .......................... 417/571 |
| 6,158,974 A | * | 12/2000 | Tarutani et al. ............. 417/269 |
| 6,174,147 B1 | * | 1/2001 | Tarutani et al. ............. 417/269 |
| 6,231,315 B1 | * | 5/2001 | Ikeda et al. ................. 417/269 |

FOREIGN PATENT DOCUMENTS

| EP | 0595313 | 5/1994 | ................. 417/269 |
| JP | 59113278 | 6/1984 | ................. 417/269 |

* cited by examiner

Primary Examiner—Cheryl J. Tyler
(74) Attorney, Agent, or Firm—Morgan & Finnegan, LLP

(57) ABSTRACT

In the present compressor, a retainer is prevented from being deformed without impairing the sealing performance of a metal gasket provided between a covering member for closing a compression chamber of a cylinder block assembly and a discharge valve forming plate. A discharge valve forming plate is provided between a valve plate having at least one discharge port through which a fluid compressed in a compression chamber of a cylinder block assembly is discharged into a discharge chamber of a housing and the cylinder block assembly. A retainer for restricting the magnitude of opening of a discharge valve is integrally formed in a metal gasket which is provided between the discharge valve forming plate and the housing. The housing is provided with a restricting section at a position corresponding to a proximal portion of a rising portion of the retainer for restricting the proximal portion of the top surface of a rising portion.

6 Claims, 4 Drawing Sheets

COMPRESSOR

BACKGROUND OF THE INVENTION

1. Field of the Invention

The present invention relates to a compressor used for a vehicular climate control system or the like.

2. Description of the Related Art

Swash plate type compressors employed for vehicular climate control systems have been known. The swash plate type compressor disclosed, for example, in Japanese Patent Application Laid-open No. 59-113278 filed Jun. 29, 1984 in the name of Nippon Denso Co. Ltd. and EPA Publication No. 0 595 313A1 filed Oct. 28, 1994 in the name of Sanden Corporation, each have cylindrical compression chambers in a cylinder block assembly. Fluids to be compressed are compressed by pistons serving as fluid compressing members provided in each of the compression chambers.

Swash plate type compressors are also equipped with front and rear housings serving as covering members for covering the compression chambers of the cylinder block assembly. Valve plates which have inlet ports through which fluids to be compressed are drawn into the compression chambers from the suction chambers formed in the housings, and discharge ports through which the fluids, which have been compressed by the pistons, are discharged into discharge chambers formed in the housings, are respectively provided between the housings and the cylinder block assembly.

The foregoing swash plate type compressors are further equipped with metallic discharge valve forming plates respectively provided between the valve plates and the housings. Plate-shaped metal gaskets respectively disposed between the discharge valve forming plates and the housings provide airtight sealing between the discharge valve forming plates and the housings.

Discharge reed valves of such compressors are formed by the above mentioned discharge valve forming plates; hence, if the compressed fluids discharged through the discharge ports have a high pressure, the discharge reed valves may be deformed beyond the elastic limit of the discharge valve forming plates. To prevent deformation or the like of the discharge reed valves, conventional compressors have retainers provided on the side opposite the respective discharge ports with the discharge reed valves placed between them so as to restrict the magnitude of opening of the discharge reed valves within the elasticity range of the discharge valve forming plates.

In such compressors, however, the retainers for restricting the magnitude of opening of the discharge reed valves are formed integrally with the foregoing metal gaskets which are extremely thin. For this reason, as the compressed fluids discharged through the discharge ports repeatedly hit the retainers, the retainers are deformed away from the discharge reed valves, leading to the likelihood that the magnitude of opening of the discharge reed valves will no longer be restricted to the elasticity range of the discharge valve forming plates.

As a conceivable measure for preventing the retainers from being deformed, the metal gaskets placed between the discharge valve forming plates and the housings can be made thicker. Making the metal gaskets thicker, however, poses the problem of impairing sealing performance of the metal gaskets.

SUMMARY OF THE INVENTION

The present invention has been accomplished with the view toward solving the problem described above. It is an object of the invention to provide a compressor which is able to prevent a retainer from being deformed without damaging the sealing performance of a metal gasket provided between a covering member which covers a compression chamber of a cylinder block assembly and a discharge valve forming plate.

To this end, according to the present invention, there is provided a compressor equipped with: a cylinder block assembly having at least one compression chamber; a fluid compressing member housed in each compression chamber for compressing a fluid; at least one covering member connected to one end of the cylinder block assembly to cover the compression chamber and defining a discharge chamber therein for receiving a fluid compressed by the fluid compressing member; at least one valve plate provided between the covering member and the cylinder block assembly and having at least one discharge port through which the fluid compressed by the fluid compressing member is discharged into the, discharge chamber; at least one metal discharge valve forming plate provided between the valve plate and the covering member to form at least one discharge reed valve for opening and closing the discharge port; at least one plate-shaped metal gasket provided between the discharge valve forming plate and the covering member; and at least one retainer formed so as to have a gently rising portion in the metal gasket to restrict the magnitude of opening of the discharge reed valve; wherein the covering member has a restricting section formed at a distal end of a cylindrical wall protruding from an inner surface thereof at a position corresponding to the proximal portion of the rising portion, and which restricts the deformation of the proximal portion of the rising portion of the retainer.

With this arrangement, the restricting section provided on the covering member prevents the rising portion of the retainer from being deformed by the compressed fluid discharged through the discharge port when the discharge valve is actuated. This eliminates the need to increase the thickness of the metal gasket provided between the discharge valve forming plate and the covering member, so that deformation of the retainer can be prevented without sacrificing the sealing performance of the metal gasket which seals the compression chamber of the cylinder block assembly.

In a preferred form of the present invention, the foregoing restricting section has an end surface of the cylindrical wall formed to approximately match the shape of the top surface of the proximal portion of the rising portion in a section taken in the direction of the thickness of the metal gasket. With this arrangement, the top surface of the proximal portion of the rising portion of the retainer does not come into local contact with the restricting section when the retainer is restricted at the time of discharge, thus minimizing the chance for wear.

In another preferred form of the present invention, the end surface of the cylindrical wall in the restricting section is formed to have an arc shape almost identical to that of the top surface of the proximal portion of the rising portion. With this arrangement, the surface of the restricting section comes into even contact with the top surface of the proximal portion of the rising portion of the the retainer when the retainer is lifted at the time of discharge. This minimizes the chance for wear.

In a further preferred form of the present invention, the restricting section comprises an intermediate surface connecting the outer periphery surface and the end surface of the cylindrical wall, which is formed to have an arc shape in a section taken in the direction of the thickness of the metal gasket. With this arrangement, sealant for the metal gasket will not protrude into the discharge chamber through a gap formed between the top surface of the rising portion of the retainer and the surface of the restricting section when the proximal portion of the rising portion of the retainer is pushed by the restricting section. This prevents the retainer from being deformed due to deterioration of the metal gasket.

BRIEF DESCRIPTION OF THE DRAWINGS

Further objects, features and aspects of the present invention will be described in the detailed description of the preferred embodiments of the present invention with reference to the attached drawings.

DESCRIPTION OF THE PREFERRED EMBODIMENTS

Referring to FIG. 1 to FIG. 4, embodiments of the present invention will be described.

Figure 2:
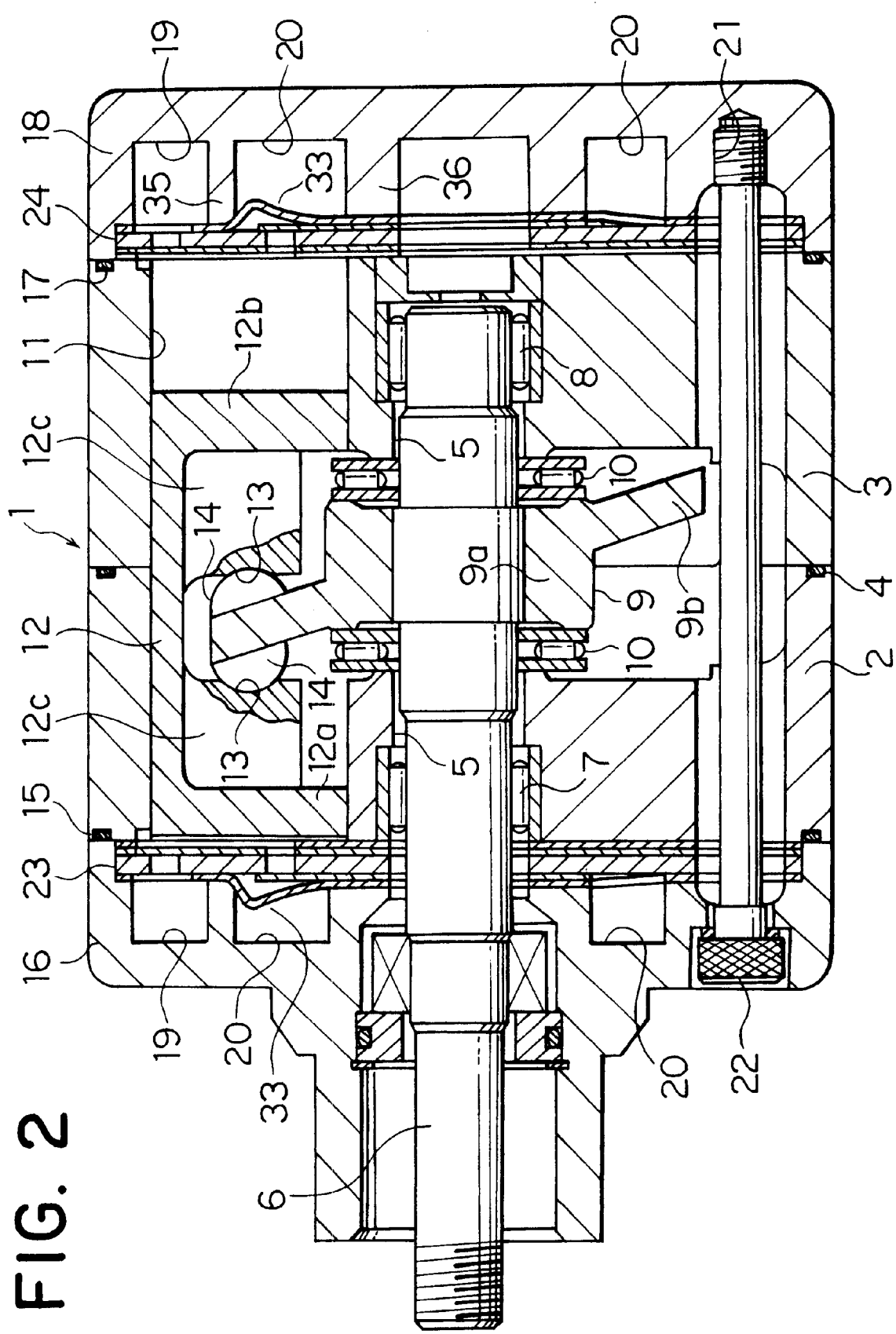
FIG. 2 is a sectional view describing the schematic configuration of the compressor according to an embodiment of the present invention.

FIG. 2 is a sectional view of a compressor in accordance with an embodiment of the invention. As shown in the drawing, a compressor 1 is equipped with a pair of cylinder blocks, i.e., a front cylinder block 2 and a rear cylinder block 3 axially butt-joined at the end surfaces thereof so as to form a cylinder block assembly, with a seal ring 4 placed at the joint. The front cylinder block 2 and the rear cylinder block 3 are made of aluminum, aluminum alloy, or the like.

The front cylinder block 2 and the rear cylinder block 3 respectively have through-holes 5 at the centers thereof. A drive shaft 6 is inserted in the through-holes 5; the drive shaft 6 is rotatably supported by a radial bearing 7 fitted in the through-hole 5 of the front cylinder block assembly 2 and a radial bearing 8 is fitted in the through-hole 5 of the rear cylinder block 3. A swash plate 9 made of aluminum, aluminum alloy, etc. is attached substantially at the axial mid-portion of the drive shaft 6.

The swash plate 9 has a boss 9a fitted onto the outer periphery of the drive shaft 6. A pair of thrust bearings 10 are provided between the boss 9a and the front cylinder block 2 and the rear cylinder block 3; the thrust bearings 10 rotatably clamp the swash plate 9 at the axial mid portion of the drive shaft 6. The swash plate 9 has a circular swash plate section 9b on the outer periphery of the boss 9a; the swash plate section 9b is inclined at a predetermined angle in the axial direction of the drive shaft 6.

Inside the front cylinder block 2 and the rear cylinder block 3, a plurality of cylindrical compression chambers 11 are provided at equal intervals around the through-hole 5 in the circumferential direction of the drive shaft 6. A double-headed piston 12 made of aluminum, an aluminum alloy, or the like is housed in each compression chamber 11.

Each piston 12 has a pair of front and rear swash plate engaging sections 12c between a front column 12a and a rear column 12b; spherical shoe receiving seats 13 are formed on the swash plate engaging sections 12c so that they are opposite each other. Hemispherical shoes 14 are slidably engaged with the shoe receiving seats 13; and the shoes 14 slide on the swash plate section 9b of the swash plate 9 as the drive shaft 6 rotates.

A front housing 16, serving as a covering member for covering and closing the open ends of cylindrical compression chambers 11, is connected via a seal ring 15 to the front end surface of the front cylinder block 2, while a rear housing 18, serving as a covering member for covering and closing the open ends of cylindrical compression chambers 11, is connected via a seal ring 17 to the rear end surface of the rear cylinder block 3. The front housing 16 and the rear housing 18 are composed of an aluminum alloy or the like. Also, the front housing 16 and the rear housing 18 respectively have two cylindrical walls 35 and 36 concentrically protruding from the inner surfaces thereof. Inside the front housing 16 and the rear housing 18, suction chambers 19 are formed respectively outside the cylindrical walls 35, while annular discharge chambers 20 are formed respectively between the cylindrical walls 35 and 36.

The rear housing 18 has a plurality of tapped holes 21 on its end surface connected to the rear cylinder block assembly 3; tightening bolts 22 are screwed from the side of the front housing into the tapped holes 21.

A front valve plate 23 is placed between the front cylinder block 2 and the front housing 16, while a rear valve plate 24 is placed between the rear cylinder block 3 and the rear housing 18. A metallic inlet valve plate 25 is respectively provided between the valve plates 23, 24, and the front cylinder block 2 and the rear cylinder block 3 as shown in FIG. 1; each inlet valve plate 25 has inlet valves 27 for opening and closing inlet ports 26 provided in each of the valve plates 23 and 24

Figure 1:
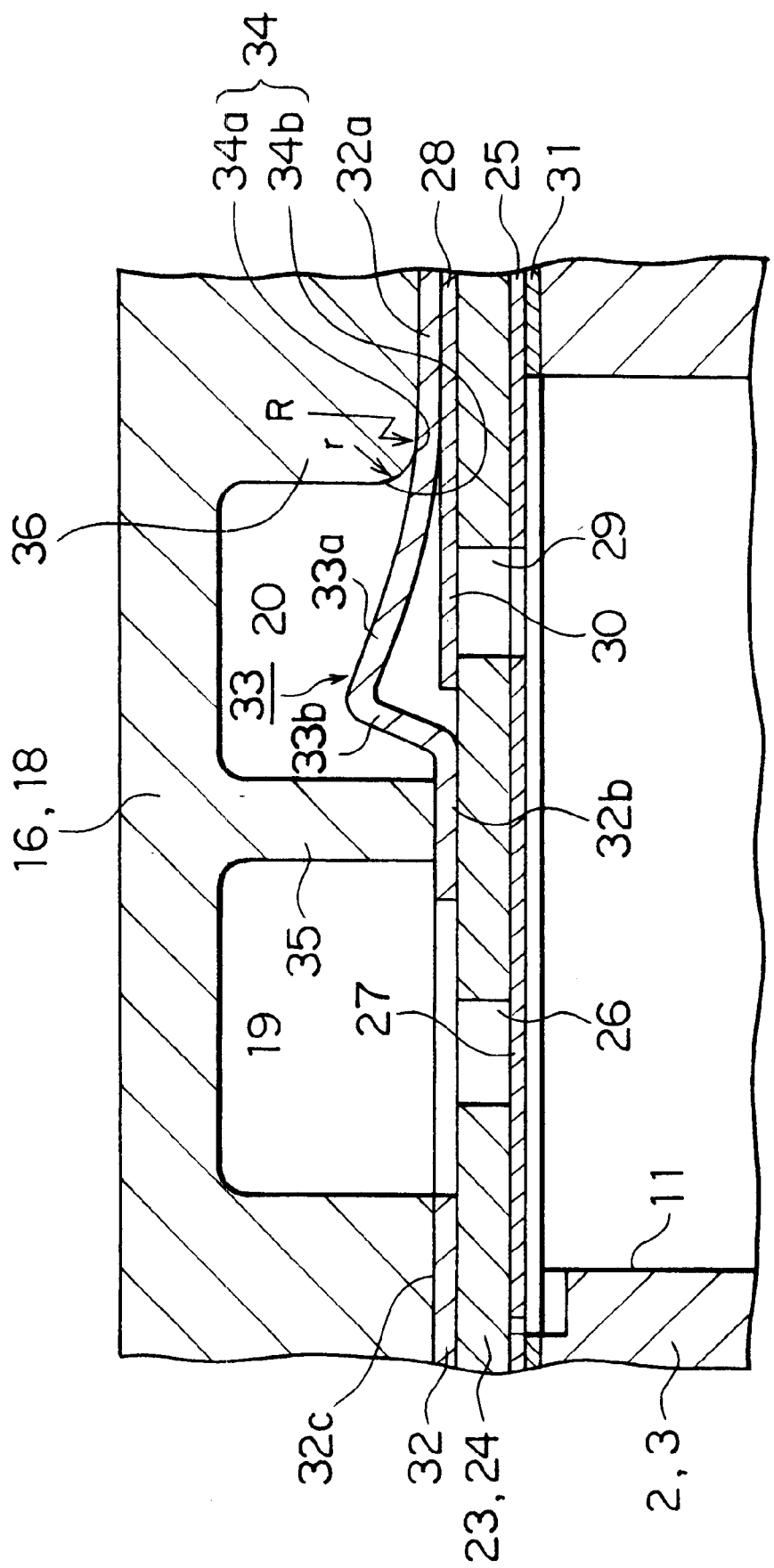
FIG. 1 is a detailed sectional view of the configuration of a compressor shown in FIG. 2.

A discharge valve forming plate 28 is respectively provided between the valve plates 23, 24, and the front housing 16 and the rear housing 18 as shown in FIG. 1. The discharge valve forming plates 28 are also metallic as are the inlet valve plates 25. Each discharge valve forming plate 28 has discharge reed valves 30 for opening and closing discharge ports 29 provided in the valve plates 23 and 24. A gasket 31 is respectively provided between the inlet valve plates 25, and the front cylinder block assembly 2 and the rear cylinder block assembly 3.

A plate-shaped metal gasket 32 is respectively provided between the discharge valve forming plates 28, and the front housing 16 and the rear housing 18 as shown in FIG. 1. The metal gaskets 32 are composed of thin metal sheets having a generally circular shape as shown FIG. 4 and have both their surfaces coated with a sealant.

The metal gaskets 32 are provided with an innermost annular portion 32a, an intermediate annular portion 32b and an outermost annular portion 32c. These three portions 32a, 32b and 32c form hermetic seals with the respective boundary portions of the suction chambers 19 and discharge chambers 20. The innermost annular portion 32a also functions to retain the discharge valve forming plates 28 in position.

The above mentioned three annular portions 32a, 32b and 32c are interconnected with one another by means of a plurality of radial ribs 331, 332, 333, 334 and the retainers 33, so that the retainers 33 for restricting the magnitude of opening of the associated discharge reed valves 30 are integrally formed with the gaskets 32. The retainers 33 are arranged so as to be in alignment with discharge reed valves 30.

Each of the retainers 33 extending between the innermost annular portion 32a and the intermediate annular portion 32b of the gasket 32 is bent outwardly so as to be composed of a gently rising portion 33a starting from the side of the innermost annular portion 32a and a sharply descending portion 33b ending at the side of the intermediate annular portion 32b when viewed from the outer face side of the gaskets 32. The retainers 33 restrict the magnitude of opening of the associated discharge reed valves 30 by contact of discharge reed valves 30 with the gently rising portions 33a.

Figure 3:
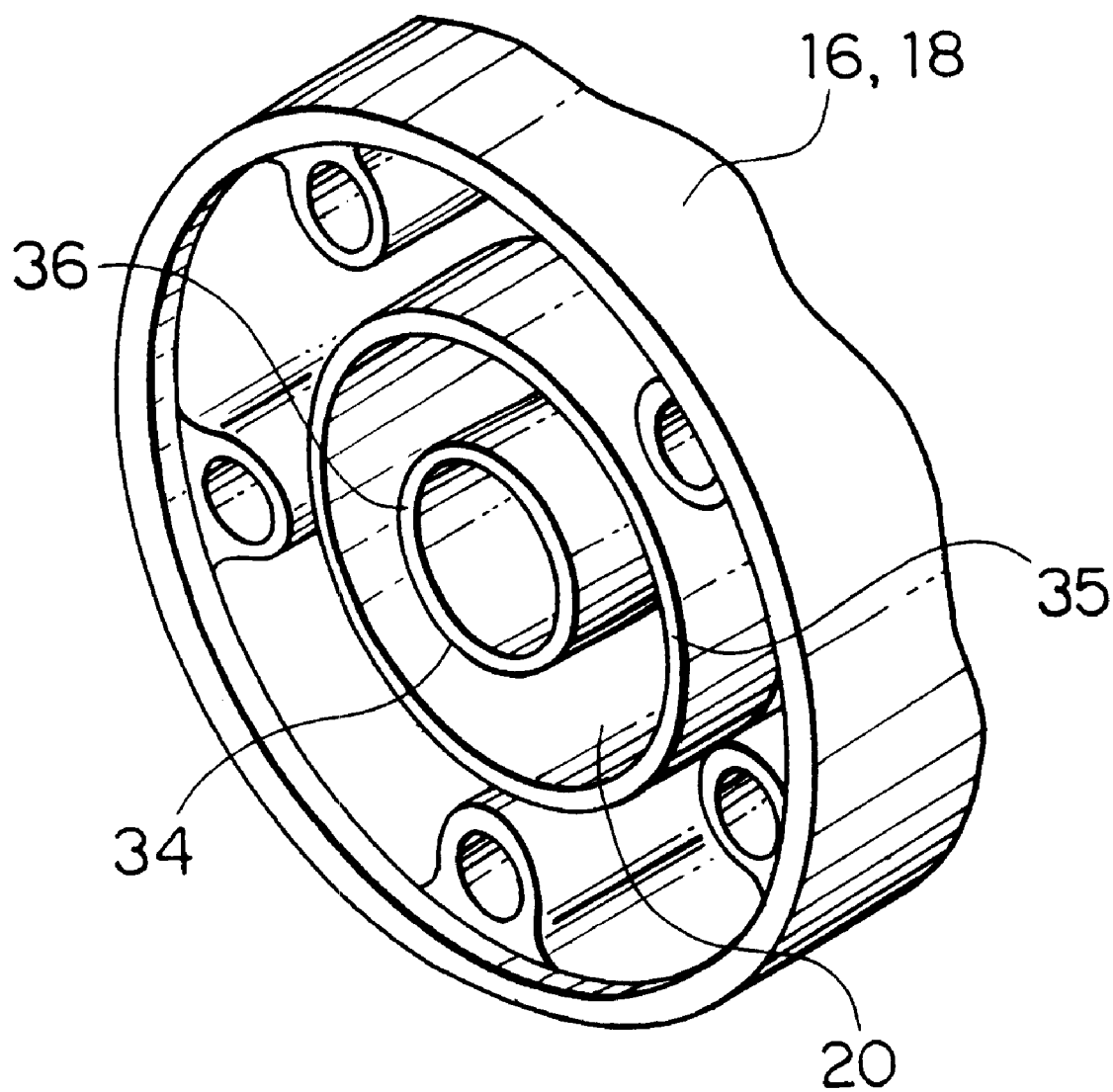
FIG. 3 is a perspective view of a rear housing as a covering member of the compressor shown in FIG. 2.
Figure 4:
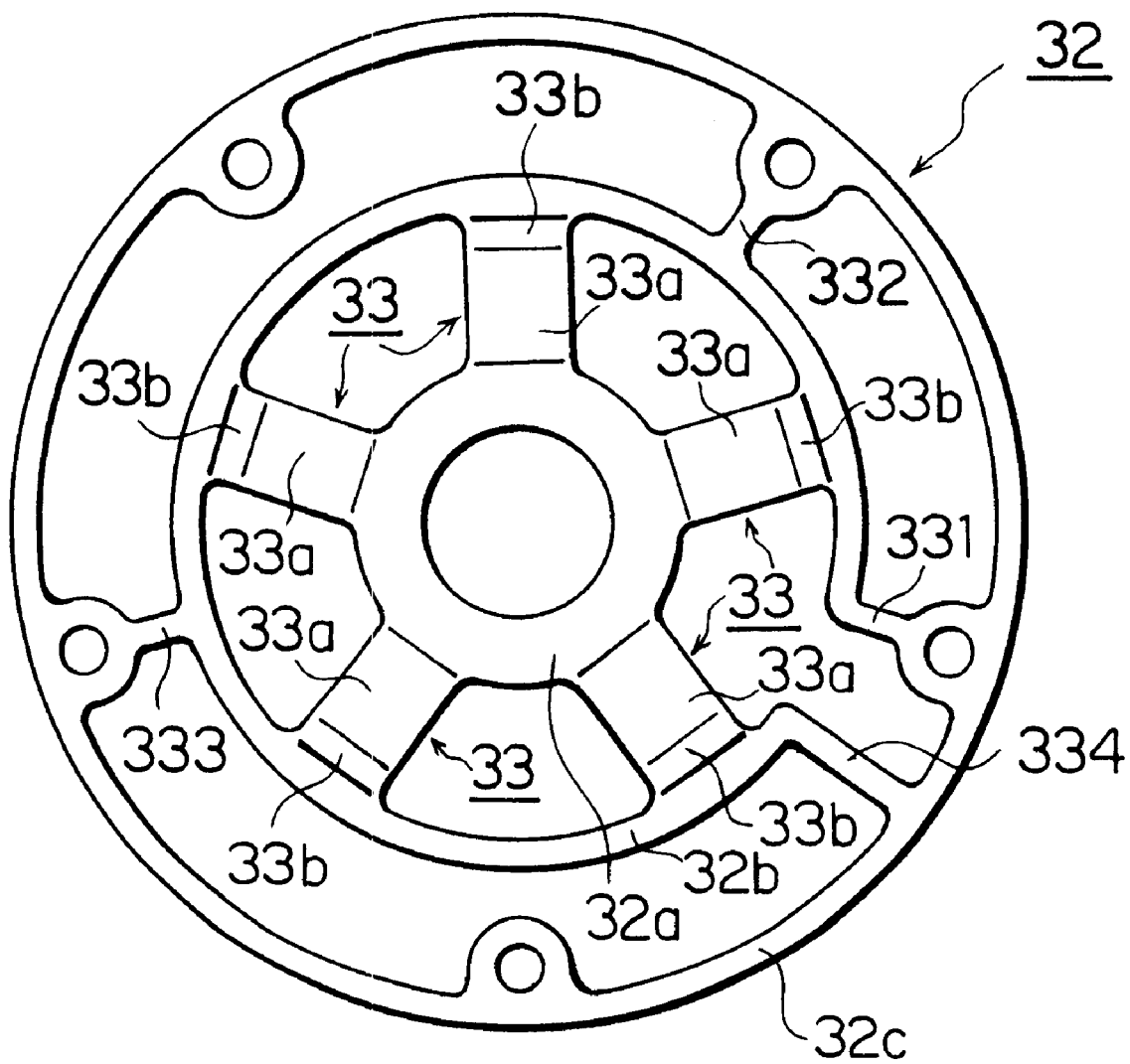
FIG. 4 is a plan view of a gasket shown in FIG. 1 and FIG. 2.

The proximal portions of the gently rising portions 33a of the retainers 33 are pressed against the discharge valve forming plates 28 by restricting sections 34 as illustrated in FIG. 1. Restricting sections 34 are respectively formed on the front housing 16 and the rear housing 18. More specifically, each of the restricting sections 34 is formed at the distal end of the cylindrical wall 36 as shown in FIG. 3.

Each of the restricting sections 34 comprise main surface portion 34a formed at the end surface of the cylindrical wall 36 and arc shaped intermediate surface portion 34b formed at a portion in the cylindrical wall 36 linking the outer periphery surface and the end surface thereof. This portion is formed to have an arc shape r as seen FIG. 1. The main surface portions 34a act to restrict excessive deformation of the retainers 33 at the time of discharge, and may be contacted by the retainers 33 within a permissible deformation range. Accordingly, main surface portion 34a of each restricting section 34 may be set so as to allow a slight gap between itself and the top surface of the gently rising portion 33a of the retainers 33, so that the gently rising portions 33a only come into contact during the discharge operation.

Preferably, the main surface portion 34a of each restricting section 34 comprises a surface that approximately matches the top surface of the proximal portion of each gently rising portion 33a such that the top surface comes into full contact with the main surface portion 34a of the restricting sections 34 at the time of discharge.

Ideally, each top surface of the proximal portions of the gently rising portions 33a is formed to have an approximately arc shape. The main surface portion 34a of each restricting section 34 is also formed to have an arc shape R approximately identical to the respective arc shape of the top surfaces of the proximal portions of the gently rising portions 33a such that the respective retainers 33 come into full contact with the main surface of the restricting section 34 when retainers 33 are lifted at the time of discharge.

In addition, the intermediate surface portions 34b formed as aforesaid produce gaps between the top surfaces of the gently rising portions 33a of the retainers 33 and restricting section 34, which gradually enlarge toward the outer periphery of the cylindrical wall 36; hence, even if sealant for the metal gaskets 32 deteriorate, the sealant will not protrude from the gaps into the discharge chambers 20; this arrangement also prevents unexpected deformation of the retainers 33.

In the compressor 1 constructed as described above, since the proximal ends of of the rising portions 33a of the retainers 33 are pressed against the discharge valve forming plates 28 by the main surface portions 34a of the restricting sections 34 formed on the front housing 16 and the rear housing 18, the retainers 33 can be prevented from being deformed away from the discharge reed valves 30 by the compressed fluids discharged from the discharge ports 29. This eliminates the need to increase the thickness of the metal gaskets 32 respectively placed between the discharge valve forming plates 28, and the front housing 16 and the rear housing 18, thus making it possible to prevent the deformation of the retainers 33 without adversely affecting the sealing performance of the metal gasket 32.

Although the present invention has been described in connection with the preferred embodiments, the invention is not limited thereto. For example, this invention is not restricted to a swash plate type compressor; instead, the invention is also applicable to other types of compressors including: crank-type reciprocating compressors, rotary compressors, and scroll-type compressors. It can be easily understood by those with ordinary skill in the art that variations and modifications of this invention as defined by the appended claims can be made without departing from the spirit of the present invention.

What is claimed is:

1. A compressor comprising:
   a cylinder block assembly having at least one compression chamber;
   a fluid compressing member housed in said compression chamber for compressing a fluid;
   at least one covering member connected to one end of said cylinder block assembly to cover said compression chamber and define a discharge chamber therein for receiving a fluid compressed by said fluid compressing member;
   a valve plate provided between said covering member and said one end of said cylinder block assembly and having at least one discharge port through which the fluid compressed by said fluid compressing member is discharged into said discharge chamber;
   a metal discharge valve forming plate provided between said valve plate and said covering member to form a discharge reed valve for opening and closing said discharge port;
   a plate-shaped metal gasket provided between said discharge valve forming plate and said covering member, a portion of said covering member forcibly engaging said plate-shaped metal gasket;
   a retainer formed in said metal gasket so as to have a contact portion to restrict the magnitude of opening of said discharge reed valve;
   wherein said covering member also defines a restricting section and a cylindrical wall defining a surface of the discharge chamber, the cylindrical wall being generally perpendicular to the plate-shaped metal gasket, the restricting section defining a continuously curved surface joining the cylindrical wall and the portion of the covering member engaging the plate-shaped gasket; and
   wherein said retainer slopes upwardly toward the discharge chamber beginning beneath the cylindrical wall and does not contact the restriction section, except at the time of discharge when the retainer contacts at least part of the restriction section.

2. A compressor according to claim 1, wherein the restricting section is formed to approximately match the shape of the top surface of said retainer.

3. The compressor according to claim 1 wherein the continuously curved surface of the restricting section has an arcuate surface of a given radius thereby causing the distance between the restricting surface and the retainer to gradually increase.

4. A swash-plate type compressor comprising:
   a cylinder block assembly having a plurality of compression chambers defined therein;
   a fluid compressing means for compressing a fluid in each of said compression chambers including a drive shaft extending into said cylinder block assembly, a swash plate fitted onto said drive shaft for rotation therewith, and a plurality of double-headed pistons connected to said swash plate to allow a reciprocative motion of each of said pistons in said respective compression chambers when said drive shaft is driven;

front and rear covering members connected to corresponding ends of said cylinder block assembly to cover said compression chambers and respectively define discharge chambers therein for receiving the fluid compressed by said fluid compressing means;

a valve plate provided between each of said covering members and said cylinder block assembly, each plate having a plurality of discharge ports through which the fluid compressed by said fluid compressing means is discharged into said discharge chamber;

a metal discharge valve forming plate provided adjacent to each of said valve plates at the sides thereof facing said covering members to form discharge reed valves to respectively open and close said discharge ports;

a metal plate gasket provided between each covering member and each metal discharge valve forming plate, a portion of said covering members forcibly engaging said metal plate gasket;

retainers formed in each of said metal plate gaskets so as to have contact portions to restrict the magnitude of opening of the respective discharge reed valves;

wherein each of said covering members also define a restricting section and a cylindrical wall defining a surface of the discharge chamber, the cylindrical wall being generally perpendicular to the metal plate gasket, the restricting section defining a continuously curved surface joining the cylindrical wall and the portion of the covering member engaging the metal plate gasket; and wherein said retainers slope upwardly toward the discharge chamber beginning beneath the restricting section and do not contact the restriction section, except at the time of discharge when the retainers contact at least part of the restriction section.

5. The swash-plate type compressor according to claim 4, wherein each restricting section is formed to approximately match the shape of the respective retainer.

6. The compressor according to claim 4 wherein the continuously curved surface of each the restricting sections has an arcuate surface of a given radius thereby causing the distance between the restricting surface and the retainer to gradually increase.

* * * * *

UNITED STATES PATENT AND TRADEMARK OFFICE
CERTIFICATE OF CORRECTION

PATENT NO.   : 6,454,545 B1
DATED        : September 24, 2002
INVENTOR(S)  : Ikeda et al.

It is certified that error appears in the above-identified patent and that said Letters Patent is hereby corrected as shown below:

<u>Title page, Item [54] and Column 1, line 1,</u>
Please delete "COMPRESSOR" and insert therefor -- RETAINING MEANS FOR THE DISCHARGE VALVE OF A COMPRESSOR --.

<u>Column 2,</u>
Line 19, please delete "into the, discharge" and insert therefor -- into the discharge --.

Signed and Sealed this

First Day of April, 2003

JAMES E. ROGAN
*Director of the United States Patent and Trademark Office*